United States Patent [19]

Reuter et al.

[11] 4,340,681
[45] Jul. 20, 1982

[54] PROCESS FOR THE MANUFACTURE OF FOAMED OR NON-FOAMED COMPOSITIONS

[75] Inventors: Franz G. Reuter, Lemförde; Karl-Heinz Hilterhaus, Georgsmarienhütte, both of Fed. Rep. of Germany

[73] Assignees: Reuter Technologie GmbH, Lemförde; Chemie-Anlagenbau Bischofsheim GmbH, Osnabrück, both of Fed. Rep. of Germany

[21] Appl. No.: 192,592

[22] PCT Filed: Sep. 28, 1979

[86] PCT No.: PCT/DE79/00118

§ 371 Date: May 29, 1980

§ 102(e) Date: May 28, 1980

[87] PCT Pub. No.: WO80/00705

PCT Pub. Date: Apr. 17, 1980

[30] Foreign Application Priority Data

Sep. 29, 1978 [DE] Fed. Rep. of Germany ....... 2842582

[51] Int. Cl.$^3$ .............................................. C08G 18/14
[52] U.S. Cl. .................................... 521/123; 528/57
[58] Field of Search .......................... 521/123; 528/57

[56] References Cited

U.S. PATENT DOCUMENTS 3,108,975 10/1963 Lambert et al. .................... 521/123
4,176,218 11/1979 Demou et al. ...................... 521/123

*Primary Examiner*—Maurice J. Welsh
*Attorney, Agent, or Firm*—Stevens, Davis, Miller & Mosher

[57] ABSTRACT

The present invention relates to a process for the manufacture of foamed or non-foamed compositions, in which one or more organic or inorganic compounds containing at least two isocyanate groups is or are reacted in the presence of an alkaline aqueous solution, an alkaline aqueous suspension or an alkaline aqueous slurry of an alkali metal hydroxide and/or alkaline earth metal hydroxide, and of one or more catalysts and, optionally, inert fillers and/or, optionally, one or more volatile substances as blowing agents. According to the invention, a mixture of the compound or compounds containing the isocyanate groups and the alkali metal hydroxide or oxide and/or alkaline earth metal hydroxide or oxide is added to a mixture of water and catalyst. The oxide employed is preferably calcium oxide.

5 Claims, No Drawings

PROCESS FOR THE MANUFACTURE OF FOAMED OR NON-FOAMED COMPOSITIONS

The invention relates to a process, for the manufacture of foamed or non-foamed compositions, in which one or more organic or inorganic compounds containing at least two isocyanate groups is or are reacted in the presence of an alkaline aqueous solution, an alkaline aqueous suspension or an alkaline aqueous slurry of an alkali metal hydroxide and/or alkaline earth metal hydroxide, and of one or more catalysts and, optionally, inert fillers and/or, optionally, one or more volatile substances as blowing agents.

The subject of the invention is a process, for the manufacture of foamed or non-foamed compositions, in which one or more organic or inorganic compounds containing at least two isocyanate groups is or are reacted in the presence of an alkaline aqueous solution, an alkaline aqueous suspension or an alkaline aqueous slurry of an alkali metal hydroxide and/or alkaline earth metal hydroxide, and of one or more catalysts and, optionally, inert fillers and/or, optionally, one or more volatile substances as blowing agents, which is characterized in that a mixture of the compound or compounds containing isocyanate groups and the alkali metal hydroxide or oxide and/or alkaline earth metal hydroxide or oxide, the oxide employed preferably being calcium oxide, is added to a mixture of water and catalyst.

The inorganic isocyanates used according to the invention are described inter alia in Polyurethanes, Chemistry and Technology, volume 1, J. H. Saunders and K. C. Frisch, pages 100 to 103 and in the literature cited in this publication. The said literature is likewise specifically cited in this specification, so that these literature citations also are to be regarded as disclosures within the framework of this invention.

The isocyanates employed according to the invention include those isocyanate compounds which customarily are employed in polyurethane chemistry and which contain at least two isocyanate groups. Mixtures of isocyanates which contain a predominant amount of polyisocyanate compounds containing at least three isocyanate groups are preferably employed according to the invention. Examples of such mixtures are the isocyanates obtainable commercially under the protected names "Desmodur 44 V" and "PAPI." Mixtures of polyisocyanates which are particularly preferentially employed include the mixtures of polyisocyanates which contain virtually no diisocyanates and monoisocyanates and which are obtained by the process described in German Offenlegungsschrift No. 2,105,193. In this process a mixture of organic polyisocyanates which is obtained by phosgenation of crude aniline-formaldehyde resins and which contains a predominant amount of the diphenylmethane diisocyanate isomers and polyisocyanates with a higher number of functional groups and with more than two benzene rings in the molecule is separated into the diphenylmethane diisocyanate isomers and into the polyisocyanates with a higher number of functional groups.

Of course, the NCO pre-adducts employed in the manufacture of polyurethanes can also be used according to the invention. The NCO pre-adducts are higher molecular weight compounds which contain at least two terminal NCO groups and which preferably have a molecular weight of 500 to 10,000 and in particular of between 800 and 2,500. Preferably, these NCO pre-adducts contain 1.5 to 5% of NCO groups. These NCO pre-adducts are prepared in a known manner, by reacting higher molecular weight compounds containing OH groups with an excess of polyisocyanate. The preparation of such NCO pre-adducts is described, for example, in Angewandte Chemie 64, 523 to 531 (1952), Kunststoffe 43, 303 to 310 (1952), German Pat. No. 831,772, German Pat. No. 897,014, German Pat. No. 929,507 and U.S. Pat. No. 3,000,757.

Higher molecular weight compounds, contaning OH groups, which are suitable for the preparation of the NCO pre-adducts are, for example: polyesters, polyethers, polyester-amides, polythioethers and polyacetates.

Furthermore, higher molecular weight compounds containing terminal carboxyl, amino and mercapto groups are also suitable. Polysiloxanes, which contain groups reactive towards isocyanates, may also be mentioned. Further compounds which can be used are described, for example, in J. H. Saunders and K. C. Frisch "Polyurethanes" Part 1, New York, 1962, pages 33 to 61 and in the literature cited in this publication.

Any suitable organic diisocyanate can be used to prepare the NCO pre-adducts. Isocyanate compounds which contain groups which either are ionic and/or behave as ionic groups in an alkaline reaction mixture can also be used according to the invention.

The catalysts which can be employed according to the invention are described, with details of their mode of action, in Kunststoff-Handbuch (Plastics Handbook), volume VII, edited by Vieweg and Höchtlen, Carl Hanser-Verlag, Munich 1966, for example on pages 96 to 102.

The catalysts are as a rule employed in an amount of between about 0.001 and 10% by weight, based on the amount of isocyanate.

In particular, preferred catalysts are those which possess reactive groups, such as hydroxyl and amino radicals, which are able to react with isocyanates and are also incorporated into the polymer skeleton during the formation of the polymer and contribute to cyclization of the isocyanates to isocyanurates, if this is possible.

Examples of suitable catalysts are, therefore, 2,4,6-tris-(dimethylaminomethyl)-phenol, methyldiethanolamine, N-methyldipropyldiamine, dibutylaminoethanol, dimethylamino-2-propanol, diethylaminoethoxyethanol and o-tolylpropanolamine. Further suitable catalysts include 1,4-diaza[2.2.2]bicyclooctane (DABCO ®, also termed triethylenediamine), N,N'-bis-dimethyldiethyl-piperazine, hexamethyltriethylenetetramine, dimethylbenzylamine, catalyst A-1 (UCC), dimethylcetylamine, 1,8-diazabicyclo[5.4.0]undec-7-ene and tetramethyl-1,3-butanediamine.

Compounds which are particularly suitable as catalysts for the purposes of the invention are those which are to be termed zwitterionic compounds, that is to say those compounds which contain in the molecule at least one group with a positive charge and at least one group with a negative charge and which preferably additionally contain at least one hydrogen atom which is active according to Zerewitinov. Compounds from this group which are preferably employed thus include compounds of the general formula

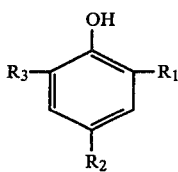

in which the radicals $R_1$, $R_2$ and $R_3$ represent hydrogen atoms or a radical of the general formula

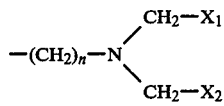

in which n is an integer from 1 to 25 and the radicals $X_1$ and $X_2$ denote hydrogen atoms and/or alkyl radicals having 1 to 25 carbon atoms, and the radicals $R_1$, $R_2$ and $R_3$ can be different, not more than two of the radicals $R_1$, $R_2$ and $R_3$ may be hydrogen atoms and the alkyl radicals can carry primary and/or secondary hydroxyl groups.

Amongst these compounds, those which are particularly preferred are tertiary amino compounds which contain a phenolic hydroxyl group and additionally contain at least one further hydroxyl group, that is to say tertiary amino compounds of the general formula

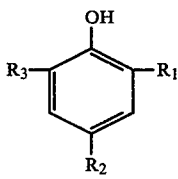

in which the radicals $R_1$, $R_2$ and $R_3$ represent hydrogen atoms or a radical of the general formula

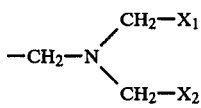

in which the radicals $X_1$ and/or $X_2$ denote hydrogen atoms, alkyl radicals having 1 to 25 carbon atoms or the radical $-(CH_2)_mOH$ (m is an integer from 0 to 25), and not more than two of the radicals $R_1$, $R_2$ and $R_3$ may be hydrogen and at least one of the radicals $R_1$, $R_2$ and $R_3$ must carry a hydroxyl group.

Tertiary amino compounds which display zwitterionic characteristics and fall under the above general formula and are preferably employed according to the invention are 2,4,6-tris-(ethyl-2-hydroxyethylaminomethylene)-phenol of the formula

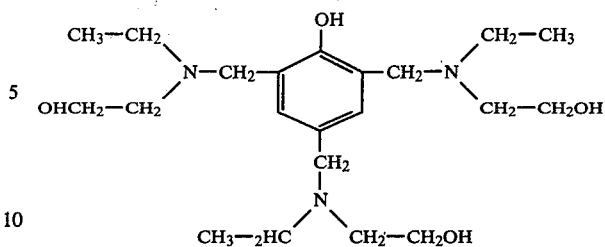

and 2,4,6-tris-(dimethylaminomethyl)-phenol.

When foams are manufactured by the process according to the invention it is preferable additionally to employ blowing agents, especially inert liquids which boil between $-25°$ and $+50°$ C. and preferably between $-15°$ and $+40°$ C. These are, in particular, alkanes, alkenes, halogen-substituted alkanes or alkenes or dialkyl ethers. Such substances are, for example, saturated or unsaturated hydrocarbons having 4 to 5 C atoms, such as isobutylene, butadiene, isoprene, butane, pentane, petroleum ether and halogenated saturated or unsaturated hydrocarbons, such as methyl chloride, methylene chloride, fluorotrichloromethane, difluorodichloromethane, trifluorochloromethane, chloroethane, vinyl chloride and vinylidene chloride. The compounds which have proved most suitable are trichlorofluoromethane, vinyl chloride and $C_4$-hydrocarbons, such as, for example, butane, monofluorotrichloromethane (obtainable commercially under the protected tradenames Frigen 11 and Kaltron 11), dichlorodifluoromethane and trichlorotrifluoroethane. Monofluorotrichloromethane is preferred. Stirred-in air can serve as an additional blowing agent.

Of course, in order to manufacture foams at elevated temperature, it is also possible to carry out the reaction using higher-boiling blowing agents, for example hexane, dichloroethane, trichloroethane, carbon tetrachloride or light petroleum, as additional agents. However, the water contained in the mixture can also take over the function of the blowing agent. Furthermore, fine metal powders, for example calcium, magnesium, aluminum or zinc, can serve as blowing agents, by the evolution of hydrogen, and at the same time exert a curing and reinforcing action.

The blowing agents are employed in amounts of 0 to 50% by weight and preferably 2 to 30% by weight, based on the reaction mixture.

In order to form a particularly fine cell structure it is advisable also to mix in nucleating and cell-regulating substances. Many compounds are suitable as nucleating substances, for example finely divided inert solids, for example silicon dioxide or aluminum oxide, optionally together with zinc stearate, or amorphous silicas or metal silicates. Amongst these, the silicon dioxide which precipitates from a colloidal solution is the preferred nucleating agent.

Suitable cell-regulating substances include silicone oils based on polysiloxanes, for example the DC-193, DC-194, DC-195, L-532 and L-5340 oils from the Union Carbide Corporation, the SF 1066 and SF 1109 oils from General Electric, the DC brand oils from Wacker, Tegiloxan from Goldschmidt and Emulgin 286 from Henkel. Amongst these, DC-195, L-5340 and Emulgin 286 are preferred.

Preferably, surface-active additives are also used in the manufacture of the foams according to the invention, in order to facilitate foaming by lowering the surface tension of the system. In addition, these additives impart specific desired characteristics to the foams, as a result of an additional influence on the cell structure. Suitable compounds include, for example, surfactants (available commercially under the name Emulgin 286, manufacturer: Henkel) and also the nonionic alkylphenol oxethylates with a degree of oxethylation of about 6 to 20. Emulgin 286 and alkylphenol oxethylates with a degree of oxethylation of 9 to 10 are preferably employed.

The surface-active additives can at the same time also act as foam stabilizers. The following compounds can additionally be employed as foam stabilizers: silicone oil (obtainable commercially under the same Si L 5340, manufacturer: Union Carbide Corporation) and Emulgin 286 from Henkel.

In order further to increase the non-flammability of the homogeneous materials according to the invention, or of the foams, flame-retardant substances are added to the system. These substances can be dissolved or dispersed either in one or in both components. Flame-retardant substances soluble in the aqueous component include, for example, trisodium phosphate.12 $H_2O$. The insoluble flame-retardant additives, which, moreover, at the same time also act as reinforcing substances, include, for example, kieselguhr (diatomaceous earth), aluminum oxide, magnesium silicate, asbestos powder, chalk, asbestos fibers and glass fibers.

Suitable organic flameproofing agents are, in particular, compounds based on phosphorus/halogen, for example the compound of the formula

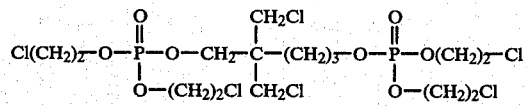

marketed by Monsanto under the name "Phosgard 2xc20." This compound contains about 35% of chlorine and about 11% of phosphorus. It is inert towards NCO groups. The particular advantages of this phosphonate ester are that the viscosity of highly viscous polyisocyanate materials can be lowered considerably by mixing with this phosphonate ester and that the material is emulsifiable with suitable emulsifiers in water. The flame-retardant properties are due not only to the relatively high phosphorus content and chlorine content, but also to the increase in the oxygen index, which—on exposure to flame—allows a hard carbonization layer to form immediately, which does not further propagate the flame. In addition to the flameproofing characteristics, the ester has the task of also neutralizing the alkaline reactant, by the P and Cl atoms. The material is odorless and of low toxicity.

In principle, the materials manufactured according to the invention can be filled with considerable amounts of fillers without losing their highly valuable spectrum of properties; very particularly preferred fillers, which have a pronounced reinforcing effect, are water-binding (hydraulic) additives of organic or inorganic nature, in particular hydraulic cement and synthetic anhydrite. A further preferred filler is fly-ash.

If sufficient amounts of such water-binding additives are used, it is also possible to employ those aqueous solutions which have a high water content, for example 60 to 90%.

The hydraulic cement used is in particular Portland cement, rapid-setting cement, blast-furnace cement, under-burned cement, sulfate-resistant cement, masonry cement, natural cement, selenitic cement, pozzolanic cement and calcium sulfate cement.

For the manufacture of hard materials, the water-binding additives are preferably employed in an amount which suffices to bind 40 to 100% of the water introduced by means of the aqueous phase. In particular, the amount of water-binding additives is 50 to 400% by weight of the amount of "total mixture."

The binding of the water, introduced by means of the aqueous phase, by hydraulic binders, in particular cement or anhydrite, is of considerable importance with regard to the behavior of the materials in the event of a fire. The water is slowly released endothermically by the action of heat and thus has a powerful effect in bringing the fire under control.

In addition, diatomaceous earth is also particularly suitable for the purposes of the invention, since it likewise fulfils several functions at the same time. As a result of its capacity for taking up a multiple of its volume of water, it assists in "drying out" the foam, without the latter shrinking. In addition, diatomaceous earth is both inert towards acids and bases and non-combustible. It can be mixed with either one of the components and, because of its very fine dispersion in the two components, produces a large increase in the "internal surface area," which in the case of the manufacture of the foams according to the invention manifests itself as an advantage by the fact that it gives rise to an emulsifying action (formation of a protective colloid).

Before mixing in, the fillers to be employed, and also the inert additives, can also be saturated, impregnated or sprayed with one of the liquid components of the mixture, for example in order to improve the adhesion or flowability.

Further examples of surface-active additives and foam stabilizers which optionally can also be used according to the invention, and also cell-regulating substances, reaction retarders, stabilizers, flame-retardant substances, plasticizers, dyes and fillers and substances having a fungistatic or bacteriostatic action are described, with details on the way in which these additives are used and their mode of action, in the Kunststoff-Handbuch (Plastics Handbook), volume VI, edited by Vieweg and Höchtlen, Carl Hanser-Verlag, Munich, 1966, for example on pages 103 to 113.

Depending on the properties which the polymers according to the invention are intended to exhibit, polyesters and polyethers, such as are used in polyurethane chemistry, can additionally be employed as reactants. Since the polyols, that is to say the polyesters and polyethers, have been described in extremely great detail in the literature on the polyurethanes, a more detailed description of these compounds will be dispensed with here.

Small plastic particles, preferably in the form of an aqueous dispersion of the plastic, can also additionally be introduced into the reaction mixture according to the invention.

Furthermore, for various applications it has proved advantageous additionally to add waterglass, preferably Na waterglass or K waterglass, to the aqueous starting component. The waterglasses which can be employed according to the invention are described, for example, in Ullmanns Encyklopädie der Technischen Chemie (Ullmann's Encyclopaedia of Industrial Chemistry), volume 15, pages 732 et seq.

The abovementioned components are mixed in the manner known from polyurethane chemistry, or in a high-speed compulsory mixer, for example a mortar mixer or a concrete mixer. As usual, a component A and a component B are first prepared and these are then mixed after the addition of appropriate additives and catalysts. The start time of the mixtures prepared in this way for foams is in general between 5 minutes and many minutes, or hours, or even days, and can be regulated as desired. If desired, the components can be warmed in order to shorten the start time. Preferably, the foams according to the invention have a density of between 15 and 750 kg/m$^3$.

For particular applications, it can be advantageous if the compositions obtained according to the invention are subjected to a subsequent heat treatment at temperatures above 100° C. and in particular above 130° up to 250° C.

EXAMPLE 1

17.9 parts by weight of water are mixed well with 2 parts by weight of 2,4,6-tris-(dimethylaminomethyl)-phenol and 0.1 part by weight of Lutensol a non-ionic surfactant of an alkyl phenol having 6 to 10 ethylene oxide units from BASF. In addition, a mixture consisting of 27.6 parts by weight of Desmodur 44 V 20 a polymer of tolylene diisocyanate, available from Bayer AG, 12.0 parts by weight of Phosgard 2xC 20 from Monsanto, 0.4 part by weight of Silicone Oil 193 from Dow Corning and 40.0 parts by weight of CaO (building lime) is prepared and the two mixtures are stirred vigorously together. A coarse-pored foam forms.

EXAMPLE 2

17.9 parts by weight of water are mixed well with 2 parts by weight of 2,4,6-tris-(dimethylaminomethyl)-phenol and 0.1 part by weight of Lutensol from BASF. In addition, a mixture consisting of 27.6 parts by weight of Desmodur 44 V 20 from Bayer AG, 12.0 parts by weight of Phosgard 2×C 20 from Monsanto, 0.4 part by weight of Silicone Oil 193 from Dow Corning and 40.0 parts by weight of cement is prepared and the two mixtures are stirred vigorously together. A coarse-pored foam forms.

EXAMPLE 3

47.7 parts by weight of sodium waterglass of 58/60 degrees Bè are mixed well with 4.3 parts by weight of water and 1.5 parts by weight of 2,4,6-tris-(dimethylaminomethyl)-phenol. In addition, a mixture consisting of 10.0 parts by weight of Desmodur 44 V 20 from Bayer, 8.0 parts by weight of Phosgard 2×C 20 from Monsanto, 0.3 part by weight of Silicone Oil 193 from Dow Corning, 15.0 parts by weight of Tresolit CP from Henkel and Co., 5.0 parts by weight of CaO and 5.0 parts by weight of trichlorofluoromethane is prepared and the two mixtures are stirred vigorously together.

A fine-pored foam with a weight per unit volume of 160 kg/m$^3$ forms.

EXAMPLE 4

45.3 parts by weight of sodium waterglass of 58/60 degrees Bè are mixed well with 1.8 parts by weight of water, 21.8 parts by weight of sodium waterglass of 48/50° Bè, 1.7 parts by weight of 2,4,6-tris-(dimethylaminomethyl)-phenol and 4.4 parts by weight of diatomaceous earth from Chemag, brand Celatom MW 31. In addition, a mixture consisting of 12.0 parts by weight of Desmodur 44 V 20 from Bayer AG, 5.0 parts by weight of Phosgard 2×C 20 from Monsanto, 0.3 part by weight of Silicone Oil 193 from Dow Corning, 2.5 parts by weight of diatomaceous earth from Chemag, brand Celaton MW 31, 15.0 parts by weight of CaO and 8.0 parts by weight of trichlorofluoromethane is prepared and the two mixtures are stirred vigorously together.

A foam with a weight per unit volume of 250 kg/m$^3$ forms.

EXAMPLE 5

45.9 parts by weight of sodium waterglass of 58/60 degrees Bè are mixed well with 4.1 parts by weight of water, 1.0 part by weight of 2,4,6-tris-(dimethylaminomethyl)-phenol and 5.0 parts by weight of diatomaceous earth from Chemag, brand Celatom MW 31. In addition, a mixture consisting of 10.0 parts by weight of Desmodur 44 V 20 from Bayer AG, 8.0 parts by weight of Phosgard 2×C 20 from Monsanto, 0.3 part by weight of Silicone Oil 193 from Dow Corning, 15.0 parts by weight of Tresolit CP from Henkel and Co., 5.0 parts by weight of CaO and 5.0 parts by weight of trichlorofluoromethane is prepared and the two mixtures are stirred vigorously together.

A foam with a weight per unit volume of 390 kg/m$^3$ forms.

EXAMPLE 6

25 parts by weight of diatomaceous earth from Chemag, brand Celatom MW 31, are mixed well with 2 parts by weight of 2,4,6-tris-(dimethylaminomethyl)-phenol, 0.1 part by weight of Lutensol from BASF and 72.9 parts by weight of water.

In addition, a mixture consisting of 27.6 parts by weight of Desmodur 44 V 20 from Bayer AG, 12.0 parts by weight of Phosgard 2×C 20 from Monsanto, 4.0 parts by weight of Silicone Oil 193 from Dow Corning and 40.0 parts by weight of CaO (building lime) is prepared and the two mixtures are stirred vigorously together.

The product designated by the tradename Desmodur 44 V 20 from Bayer AG is understood as meaning a product which consists of polyisocyanates, which have a high number of functional groups and contain more than two benzene rings in the molecule, and 4,4-diphenylmethane diisocyanate in a proportion of about 50% by weight.

The tradename Phosgard 2×C 20 from Monsanto is understood as meaning a phosphonate ester containing a proportion of chlorine atoms, one molecule consisting of a main chain, which consists of C—O—P—O— segments, and side chains, which are not longer than 1 carbon atom and carry one chlorine atom at their end in each case.

Tresolit is the tradename of Henkel and Co. for a mixture of isomeric phosphate salts in powder form.

Silicone Oil 193 from Dow Corning is a foam stabilizer, (Si—O)$_n$ chains.

We claim:

1. Process for the manufacture of foamed or non-foamed compositions comprising reacting at least one organic or inorganic compound containing at least two isocyanate groups in the presence of an alkaline aqueous solution, an alkaline aqueous suspension or an alkaline aqueous slurry of an alkali metal hydroxide or alkaline earth metal hydroxide, and at least one catalyst characterized in that a mixture of the compound containing isocyanate groups and said hydroxide or oxide is added to a mixture of water and catalyst.

2. In a process for making a synthetic resin foam wherein a compound containing Zerwitinoff hydrogen reactive with an —NCO group is reacted with a polyisocyanate, the improvement which comprises mixing with (1) an aqueous solution containing a compound of the formula

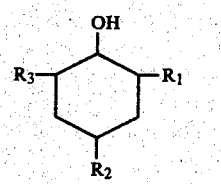

wherein $R_1$, $R_2$ and $R_3$ are hydrogen or a radical having the formula

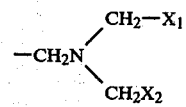

or

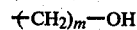

wherein M is an integer of 1 to 25 and $X_1$ and $X_2$ are hydrogen or alkyl radicals having 1 to 25 carbon atoms with the proviso that not more than two of $R_1$, $R_2$ and $R_3$ are hydrogen and at least one of $R_1$, $R_2$ and $R_3$ has a hydroxyl group.

(2) a mixture containing a compound containing at least two —NCO groups and a member selected from the group consisting of an alkali metal hydroxide or alkaline earth metal hydroxide.

3. The process of claim 2 wherein the resulting mixture containing (1) and (2) contains a blowing agent.

4. The process of claim 3 wherein said resulting mixture containing (1), (2) and a blowing agent contains an inert filler.

5. The process of claim 4 wherein the compound of formula I is 2,4,6-tris (dimethylaminoethyl)-phenol and the compound containing —NCO groups is a polymer of tolylene diisocyanate.

* * * * *